United States Patent Office 2,838,510
Patented June 10, 1958

2,838,510

NEW LOCAL ANESTHESIA PRODUCING MORPHOLINO-ALKANOL ETHERS AND SALTS THEREOF

Hans Suter, Dorflingen, and Hans Zutter, Schaffhausen, Switzerland, assignors to Eprova Limited, Schaffhausen, Switzerland No Drawing. Application December 29, 1955
Serial No. 556,060

Claims priority, application Switzerland January 8, 1955

8 Claims. (Cl. 260—247.7)

This invention relates to new basic compounds and salts thereof, which are effective local anesthetics. The invention also relates to the production of these compounds.

In particular this invention relates to new ethers of the general formula

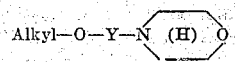

in which "Alkyl" represents an alkyl or aralkyl radical which contains six to seven carbon atoms and Y represents a branched or straight chain alkylene radical which contains three to four carbon atoms.

The invention also includes the salts of these basic ethers with inorganic and organic acids, and also their quaternary ammonium salts obtainable by reaction with esters of strong acids.

It has been found that the compounds having the structure defined above surprisingly are very valuable and efficacious local anesthetics. This discovery is very extraordinary. All prior known local anesthetics have a completely different chemical structure. See f. i. Jenkins and Hartung, The Chemistry of Organic Medicinal Products (John Wiley, 1945, p. 358). For example they contain always a pure aromatic radical which is usually connected to aliphatic parts of the molecules by a

—CO—O—, —CO—NH—, —O— or

junction.

In the compounds according to this invention this aromatic radical is replaced in most cases by a pure aliphatic radical and in some cases by an araliphatic radical. Further structural groups, characteristic for local anesthetics, formerly considered to be indispensable, for example ester or amide groups, are completely omitted in this case.

By virtue of their simple chemical structure as basic substances with an aliphatic ether group, the new compounds show an unlimited stability for practical use, which is not entirely the case with the usual present-day local anesthetics, which contain hydrolysable ester groups or amide groups.

In addition to the remarkably strong and superior local anesthetic effect, there is another very desirable supplementary effect inherent in the substances according to the invention, namely that they show a powerful vasoconstrictor action or anemizing action.

This advantageous property is very surprising, since all previously known local anesthetics show just the opposite effect. They have a definite hyperemizing action. The vasoconstrictor effect, which is usually necessary in practice must be achieved by special additives, for example an addition of adrenalin.

Local anesthetics such as those according to the invention with an inherent anemizing action therefore meet a definite practical need. Therefore our invention represents an important technical progress compared to the existing state of the art.

The new compounds can be prepared in various ways. They are most simply obtained by etherification of (4-morpholino)-alkanols with a reactive ester of a strong acid, for example in accordance with the reaction scheme

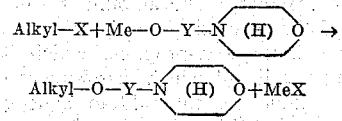

where the symbols "Alkyl" and Y have the meaning defined above, while X represents a reactive acid radical and Me a metal, preferably an alkali metal.

The etherification can of course also be effected with reaction components in which the position of the reactive group has been exchanged:

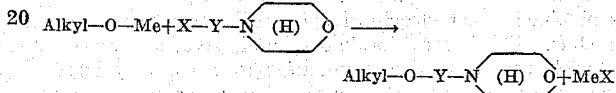

Alternatively the morpholino group can be formed from a primary amino group in the final stage of a synthesis according to the reaction scheme

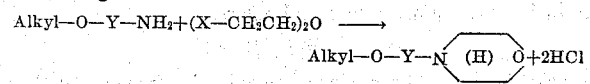

This reaction is preferably carried out in the presence of acid-binding agents such as an excess of the Alkoxy-alkyl-amine, potash etc.

In this reaction, one or both H atoms of the primary amino group can also be replaced by benzyl groups. These are split off in the reaction, for example with β,β'-dichlorodiethyl ether (see Example 2b).

The quaternary ammonium salts of the new basic ethers are obtained by reacting the basic tertiary bases with reactive esters of strong acids.

The compounds of our invention which are—as described above—therapeutically active or are useful as intermediates whether employed in the form of their free bases or in the form of their salts with relatively non toxic organic or inorganic acids or—as also described—in the form of their quaternary salts. In practicing our invention we have generally found it convenient to isolate the compounds in the form of their hydrochlorides. However, other acid addition salts are within the scope of our invention; such additional salts include the hydrobromides, sulfates, phosphates, citrates, sulfamates, tartrates, succinates, lactates, and the like.

The preparation of the compounds of the invention is illustrated by, but not restricted to the following examples:

Example 1

18.4 g. of sodium (0.8 gm. atoms) are dispersed as small droplets in 700 cc. of dry, hot xylene by vigorous stirring. The temperature of the hot bath is about 130–140° C. A solution of 116 g. of 1-morpholino-propane-2-ol (0.8 mol), obtained from propylene oxide and morpholine, B. P. 89° C./9 mm., in 150 cc. of xylene, are caused to run fairly quickly into the said sodium suspension. Hydrogen is evolved in a violent reaction. The resultant sodium alcoholate of the morpholino-propanol is completely soluble in hot xylene. After stirring for about 2 hours at 130–140° C. under reflux, all the sodium is reacted. A concentrated solution of 134 g. of n-hexyl bromide (0.8 mol) in xylene is now run into the alcoholate solution. The solution soon becomes cloudy and sodium bromide starts to precipitate. The reaction solution is kept for about 3 more hours at 130–140° C. while stirring.

The solution is now cooled and, notwithstanding the precipitated sodium bromide, is extracted with 500 cc. of 2 N-hydrochloric acid and then twice more with 100 cc. of 2 N-hydrochloric acid on each occasion. For removing entrained xylene, the extract is washed once with ether and then mixed with an excess of concentrated caustic soda solution. The light oil which separates is taken up in fresh ether, the ether solution is dried and the solvent evaporated. The residue is distilled in vacuo. B. P. 78° C./0.05 mm. The amount is 144 g., that is to say, 79% of the theoretical of the new compound 1-(4'-morpholino)-2-hexyloxy-propane, which is a colorless readily mobile liquid which dissolves readily in all conventional organic solvents, dilute aqueous mineral acids, aqueous citric acid and lactic acid, but is scarcely soluble in water.

Microanalysis calculated for $C_{13}H_{27}O_2N$ (229.35) shows C=68.07%, H=11.87%, N=6.11%; found: C=68.16%, H=11.65%, N=6.29%.

By mixing an ethereal solution of the base with ether/hydrochloric acid, the hydrochloride of the base is obtained, the hydrochloride immediately forming fine crystals. This hydrochloride can be dissolved and recrystallized from a small amount of benzene, a very large amount of benzin, from benzene/benzin or best of all from a relatively small amount of ethyl acetate. It melts at 134/135° C. and is readily soluble in practically all conventional organic solvents and also in water, as well as in hydrocarbons, ethers and esters.

*Example 2*

(a) 178 g. (1.08 mol) of 1-benzylamino-propanol-(2), obtained by the reductive reaction of 100 g. of isopropanolamine with 141 g. of benzaldehyde in 200 cc. of ethanol in the presence of Raney nickel in an autoclave with a hydrogen pressure of 100–140 atm. gauge; B. P.$_{3-4}$ 106–108° C., are quickly run into 25 g. (1.09 mol) of sodium finely dispersed in hot and practically boiling xylene. A relatively strong flow of hydrogen gas is evolved. The result of the amino alcohol being run in quickly in the hot state is to avoid any hydrogen being constantly evolved over a relatively long period, which hydrogen in statu nascendi can hydrogenolytically split off the benzyl group from some of the molecules. The sodium is almost completely reacted after about half an hour. The alcoholate which is formed dissolves completely in the hot xylene.

178 g. (1.08 mol) of n-hexyl bromide are now added dropwise over a period of 1 hour. Sodium bromide quickly starts to precipitate. The reaction mixture is boiled for a further 4 hours under reflux while stirring mechanically. The sodium bromide is filtered with suction after cooling. The xylene solution is shaken vigorously with about 500 cc. of 2 N-hydrochloric acid and the aqueous solution is separated. After standing for some time, fine colorless crystals commence to precipitate from the xylene solution and soon the entire solution forms a thick crystal magma. This is filtered with suction and a sample is dissolved and recrystallized from light benzin. Melting point 100–101° C.

The chlorine content calculated for the desired 1-benzylamino - 2 - hexyloxy - propanehydrochloride is 12.41% and the value found is 12.48%.

The hydrochloride dissolves in cold water to form a solution of a maximum concentration of 3.5%. It is very readily soluble in warm water. It dissolves equally readily in most organic solvents, with the exception of cold petroleum ether and benzin. It dissolves moderately well in xylene and benzene. The main quantity of the filtered hydrochloride is combined with the aqueous hydrochloric acid solution, some water is added and the solution is heated until it dissolves. The solution is now made strongly alkaline by adding caustic soda solution and the liquid base which precipitates is taken up in ether. The ether solution is dried and evaporated. The residue is distilled in vacuo. Boiling point 134–135° C./2–3 mm. The yield is 189 g., i. e. 70% of the theoretical. The free base is readily soluble in the conventional organic solvents and dilute mineral acids but it is only sparingly soluble in water. This base serves as initial material for the following reaction stage (b).

(b) By heating 7.2 g. (0.05 mol) of β,β'-dichlorodiethyl-ether with 38 g. (0.15 mol) of free 1-benzylamino-2-hexyloxy-propane for 6–7 hours at 150–160° C. a reaction mixture is obtained which consists mainly of 1-(4'-morpholino)-2-n-hexyloxy-propane in addition to the calculated amount (28 g.) of 1-benzylamino-2-n-hexyloxy-propane hydrochloride and some unmodified base. The said 1-(4'-morpholino)-2-n-hexyloxy-propane is obtained by distillation after the reaction mass (a crystal magma) has been treated with ether, the said hydrochloride having been filtered with suction and the solvent evaporated. The distillate (B. P.~80–90° C./0.1–0.2 mm.) is dissolved in ether and treated with ether/HCl, the finely crystallizing hydrochloride of 1-(4'-morpholino)-2-n-hexyloxy-propane precipitating immediately. After being dissolved and recrystallized once from a little benzene, the product melts at 133–134° C.

Microanalysis, calculated for $C_{13}H_{28}O_2NCl$ (265.82) is C=58.74%, H=10.62%, N=5.27%, chlorine= 13.34%, active H=0.38%, while the amounts found were C=58.68%, H=10.56%, N=5.27%, Cl=13.38%, active H=0.38%.

1-(4'-morpholino)-2-hexyloxy-propane is also obtained by heating 50 g. of 1-amino-2-hexyloxy propane (0.314 mol) with 50 g. of β,β'-dichloro-diethyl ether and 50 g. of potash, the said 1-amino-2-hexyloxy propane having been obtained by hydrogenolytic cleavage of 1-benzyl-amino-2-n-hexyloxy propane hydrochloride (see Example 2 (a)) in ethanol and in the presence of 5% palladium black in a shaking vessel at a hydrogen pressure of about 2.5 atm. gauge, the boiling point of the base being ~95° C./12 mm. Yield: 31 g., i. e. 43% of the theoretical.

*Example 3*

(a) 15 g. of 1-(4'-morpholino)-propanol-(2), obtained from propylene oxide and morpholine, are carefully added dropwise to 15 cc. of thionyl chloride in 150–200 cc. of chloroform while cooling. The reaction mixture is thereafter boiled for 2–3 hours on a water bath under reflux. The mixture is now concentrated to a volume of about 100 cc. and the dark reaction solution is poured into 500–600 cc. of dry ether while rotating well. The crystalline precipitate being formed is filtered with suction, washed with ether and then dissolved and recrystallized from about 400–500 cc. of acetone, while using some active carbon. Fine crystals of the new 1-(4'-morpholino)-2-chloro propane hydrochloride with a melting point of 173–174° C. are obtained, the said crystals being practically colorless. Yield: 12 g., i. e. ~60% of the theoretical.

Microanalysis, calculated for $C_7H_{15}ONCl_2$ is C= 42.01%, H=7.56%, N=7.00%; while the amounts found were C=42.38%, H=7.61%, N=6.78%. Ionogenically bonded Cl$^-$: calculated 17.72%, found 17.41%. This compound serves as starting material for the following reaction stage (b).

(b) 100 cc. of dry xylene are mixed with 2.3 g. of sodium metal (0.1 atomic weight). The sodium is dispersed as small droplets by vigorous stirring and at about 120–130° C. 11 g. of n-hexanol (0.108 mol) are now quickly added. A moderate reaction takes place and free hydrogen is formed. After a few minutes, the major part of the sodium is already dissolved, the solution begins to become cloudy and n $C_6H_{13}$—O—Na is precipitated as a fine white mass. After heating and stirring for about 1 hour, practically all the sodium is reacted. The heating means is removed and the substance cooled with iced water. 10 g. of solid 1-(4'-morpholino)-2-chloropropane hydrochloride (0.05 mol) are now added to the reaction mixture in the course of about 15 minutes. The mixture is stirred for a further 30 minutes at room temperature and then for 1 hour at about 100–200° C.

After cooling, the mixture is worked up as more fully described in Example 1; extraction of the product with 100 cc. of 2 N=HCl, extraction of the extract with ether, mixing with an excess of caustic soda solution, extraction with ether, evaporation, distillation of the residue in vacuo. 8.1 g. of 1-(4'-morpholino)-2-n-hexyloxy propane are obtained, i. e. 71% of the theoretical.

*Example 4*

7.1 g. of sodium metal (0.309 gm. atoms) are finely dispersed in 350 cc. of hot xylene by vigorous stirring. Hot bath temperature about 140° C. 44 g. of N-(3-hydroxypropyl)-morpholine (0.303 mol) are quickly added to this sodium suspension. Hydrogen is evolved in a violent reaction. However, the reaction soon subsides and the reaction solution must be vigorously stirred for 5 hours at 140–160° C. (bath temperature) until the transformation is practically complete. 50 gm. of n-hexyl bromide (0.303 mol) are now added dropwise to the boiling reaction solution in the course of 1 hour and sodium bromide is immediately formed. It is kept for a further 3 hours under reflux while stirring. After cooling, the reaction solution is extracted once with 200 cc. of 2 N-hydrochloric acid and then twice, each time with 50 cc. of 2 N-hydrochloric acid. The hydrochloride solution is washed with ether for removing entrained xylene. The solution is then made alkaline with NaOH and the base which separates out is taken up in fresh ether. The ether solution is dried and evaporated. The residue is distilled in vacuo. B. P.: 122° C./3–4 mm. Amount: 42 g. i. e. 606% of the theoretical. The new 1-(4'-morpholino)-3-hexyloxy propane is a colorless readily mobile liquid which is readily soluble in all usual organic solvents, dilute aqueous mineral acids and aqueous citric acid and lactic acid, but is scarcely soluble in water. 16 g. of this base are dissolved in 120 cc. of acetic ester and mixed with 13.5 cc. of 5.26 N-ethereal hydrochloric acid. After standing for some time, the crystals of the hydrochloride which is formed, which have a lustre similar to that of mother-of-pearl, are filtered with suction and dissolved and recrystallized from some acetic ester. The hydrochloride melts at 128–128.5° C. It is readily soluble in water and in most organic solvents, with the exception of benzins, ethers and esters.

Microanalysis, calculated for $C_{13}H_{28}O_2NCl$ is C=58.74%, H=10.62%, N=5.27%, Cl=13.34%, the amounts found being C=58.55%, H=10.61%, N=5.01%, Cl=13.11%.

1-(4'-morpholino)-3-n-hexyloxy propane is also obtained in a manner exactly analogous to that described in Example 3 by reacting 15 g. of N-(3-hydroxy-propyl)-morpholine with 15 cc. of thionyl chloride and subsequent reaction of 10 g. of the 1-(4'-morpholino)-3-chloro-propane hydrochloride (melting point 167–169° C.) so obtained with a suspension of n-$C_6H_{13}$ONa in xylene, obtained from 12 g. of n-hexanol, 2.3 g. of sodium and 100 cc. of dry xylene by heating and stirring.

*Example 5*

(a) In a manner similar to that described in Examples 1, 2 (a) and 4, 65 g. of 3-aminopropanol-(1) (0.87 mol) are transformed with 20 g. of sodium (0.87 gm. atom) into the corresponding sodium alcoholate. As frequently to be observed with primary amino alcohols, the alcoholate is only sparingly soluble in hot xylene and is precipitated as a lumpy gelatinous mass which can only be stirred with difficulty. The reaction with the sodium therefore requires stirring for 9 to 10 hours with a bath temperature of 140–150° C. After this time, 145 g. of n-hexyl bromide (0.87 mol) are caused to run in over a period of 2 hours. The reaction mixture is kept for some hours under reflux while constantly stirring vigorously.

After cooling, the sodium bromide is filtered off with suction and the filtrate extracted with 2 N-hydrochloric acid. The extract is washed once or twice with ether, whereupon it is made strongly alkaline and the base which precipitates is taken up in fresh ether. This ethereal solution is dried and evaporated. The residue is distilled in vacuo. Since the product foams violently on distillation, this must be done over an open flame. The 1-hexyloxy-3-aminopropane boiled at about 100° C. at a pressure of 12 mm. Yield: 85 g., i. e. 61% of the theoretical. The new base is readily soluble in organic solvents and dilute aqueous mineral acids, but is only sparingly soluble in water.

This compound serves as starting material for the following reaction stage (b).

(b) 80 g. of 1-hexyloxy-3-aminopropane (0.5 mol) are heated in an oil bath at about 100–140° C. with 78.5 g. of β,β'-dichlorodiethyl ether (0.55 mol) and 83 g. of potash (0.6 mol) while stirring vigorously. A violent reaction is initiated and there is strong evolution of carbon dioxide. The oil bath must be temporarily removed. After the intensive reaction has subsided, the mixture must be heated for approximately 3 more hours at 160–180° C. while stirring constantly.

After cooling, the reaction mass is pulverised and repeatedly extracted with hot benzene. The benzene extracts are combined, dried over $Na_2SO_4$ and evaporated. The residue is distilled in vacuo, B. P. 121° C./3–5 mm. Yield: 68 g., i. e.~60% of the theoretical.

The 1-(4'-morpholino)-3-n-hexyloxy propane thus obtained is already pure after being distilled once.

Microanalysis calculated for $C_{13}H_{27}O_2N$ (229.35) is C=68.07%, H=11.87%, N=6.11%, the amounts found being C=68.26%, H=11.93%, N=6.21%.

*Example 6*

(a) In the same manner as in Example 1, 2 (a), 4 and 5, by reaction of 70 g. of 2-aminopropanol with 21.25 g. of sodium and then with 155 g. of n-hexyl bromide in xylene, there are obtained 75 g. of 1-n-hexyloxy-2-aminopropane, this being 50% of the theoretical. This compound foams on being distilled in vacuo. B. P.~90° C./16mm. Equivalent weight, calculated 159, found 161. The new basic ether is readily soluble in organic solvents and dilute mineral acids, but is only sparingly soluble in water. This compound serves as starting material for the following reaction stage (b).

(b) 21 g. of the 1-n-hexyloxy-2-aminopropane (0.132 mol) obtained by the above method, are heated for 7 hours at 150–160° C. with 6.5 g. of β,β'-dichlorodiethyl ether (0.0455 mol). After cooling, the dark brown liquid is mixed with water and repeatedly extracted with petroleum ether. The 2-(4'-morpholino)-1-n-hexyloxypropane which is formed migrates into the petrol ether and the 1-n-hexyloxy-2-aminopropane hydrochloride which is readily soluble in most of the usual organic solvents and which has formed in the reaction is now disposed in the aqueous phase.

The petroleum ether extract is evaporated and the residue distilled in vacuo. B. P.: 123° C./4–6 mm. Yield: 5.45 g., i. e. 54% of the theoretical.

Microanalysis, calculated for $C_{13}H_{27}O_2N$ is C=68.07%, H=11.87%, N=6.11%, the amounts found being C=68.26%, H=11.70%, N=6.24%.

The new base is sparingly soluble in water but readily soluble in organic solvents and dilute mineral acids. About 50% of the 1-n-hexyloxy-2-aminopropane which is used can be recovered from the aqueous extract.

1-n-hexyloxy-2-aminopropane can also be reacted with β,β'-dichlorodiethyl-ether in the presence of potash analogously to Examples 2 (b) and 5 (b) to yield 2-(4'- morpholino)-1-n-hexyloxy-propane. This process is particularly economical since it is not necessary to use any excess amine for fixing the hydrochloric acid being formed in the reaction.

By mixing a solution of 5 g. of the new base in 50 cc. of ether with 4.2 cc. of 5.26 N-ethereal hydrochloric acid, there is obtained the hydrochloride of 2-(4'-morpholino)-1-n-hexyloxy-propane. By dissolving the latter in a small amount of warm acetic ester and careful precipitation with dry ether, the said hydrochloride can be obtained in a completely colorless and pure form. The hydrochloride melts at 104–105° C. It is readily soluble in water and most organic solvents, with the exception of benzins and ethers.

*Microanalysis.*—Calculated for $C_{13}H_{28}O_2NCl$: $C=58.74\%$, $H=10.62\%$, $N=5.27\%$, $Cl=13.34\%$. Found: $C=58.66\%$, $H=10.60\%$, $N=5.15\%$, $Cl=13.18\%$.

In a similar manner as described above (Example 6 (*b*)) 2-(4'-morpholino)-1-benzyloxy-propane (B. P. 91° C./0.01–0.05 mm.) is produced by treating 25 g. of 1-benzyloxy-2-amino-propane (0.15 mol) with 7.2 g. of β,β'-dichlorodiethylether (0.05 mol) for some hours at 130–150° C. The new base is sparingly soluble in water but readily soluble in organic solvents and dilute mineral acids.

The hydrochloride of 2-(4'-morpholino)-1-benzyloxy-propane melts at 103–106° C. It is readily soluble in water and alcohols but is only sparingly soluble in petroleum ether and ethers.

*Example 7*

In the same manner as set out in Examples 1, 2 (*a*), 4 and 5, by reacting 58 g. of 1-(4'-morpholino)-2-hydroxypropane (0.4 mol) with 9.3 g. of sodium metal (0.404 gm. atom) in xylene and a subsequent reaction with 51 g. of benzyl chloride (0.403 mol), there are obtained 73.5 g. of 1-(4'-morpholino)-2-benzyloxy-propane, this representing 78% of the theoretical. The new compound boils at 105° C./0.01 mm. It is readily soluble in all usual organic solvents and dilute mineral acids, but is scarcely soluble in water.

Microanalysis, calculated for $C_{14}H_{21}O_2N$ (235.32) is $C=71.45\%$, $H=9.00\%$, $N=5.95\%$, the amounts found being $C=71.69\%$, $H=8.71\%$, $N=5.84\%$.

The hydrochloride of the new base melts at 137/138° C. It is readily soluble in water and ethanol, but only sparingly soluble in ether, petroleum ether, cold benzene and acetic ester. It can be dissolved and recrystallized from benzene, acetone or acetic ester.

Microanalysis, calculated for $C_{14}H_{22}O_2NCl$ (271.79) is $C=61.86\%$, $H=8.16\%$, $N=5.15\%$, $Cl=13.05\%$, the amounts found being $C=62.05\%$, $H=8.35\%$, $N=4.92\%$, $Cl=13.11\%$.

*Example 8*

(*a*) Using in principle the same method as that described in the earlier Examples 1 and 2 (*a*) and by reacting 46 g. of 2-amino-butanol-(3), obtained by reducing the 2-nitrobutane-(3)-ol obtained from nitroethane and acetaldehyde, with 12 g. of sodium in 600 cc. of xylene for 1 hour, followed by reaction with 87 g. of n-hexyl bromide, there are obtained 60 g. of the new 2-n-hexyloxy-3-amino butane, this being 67% of the theoretical. This compound foams violently when distilled in vacuo. B. P.: 91–93° C./12 mm. The new basic ether is readily soluble in organic solvents and dilute mineral acids, but sparingly soluble in water.

(*b*) 31 g. of the 2-n-hexyloxy-3-aminobutane (0.18 mol) obtained by the above method are heated with 8.6 g. of β,β'-dichlorodiethyl ether (0.06 mol) for 6–7 hours at 140–150° C. After cooling, the mixture is mixed with water and extracted with petroleum ether or light benzin. The extract contains the desired 2-n-hexyloxy-3-(4'-morpholino)-butane, which is purified by vacuum distillation. B. P. 85° C./0.1–0.01 mm. The new base is readily soluble in organic solvents and dilute mineral acids. The same compound is also obtained by reaction with β,β'-dichlorodiethyl ether in the presence of potash, similar to that described in Examples 2 and 5.

*Example 9*

10 g. of 1-(4'-morpholino) - 2 - n - hexyloxy - propane (0.044 mol) as mentioned in Examples 1–3 are heated with 7.3 g. of methyl bromide (0.077 mol) in about 40 cc. of acetic ester in a closed vessel for 4 hours at 90° C. After cooling and standing for some time, the methobromide of 1-(4'-morpholino)-2-n-hexyloxy-propane crystallizes out. It is filtered with suction, washed with a small amount of acetic ester and the pure white crystal mass is repeatedly washed in petroleum ether. The initially highly hygroscopic product becomes somewhat more stable in air as a result of this treatment. It is now recrystallized from about 50–60 cc. of acetic ester, filtered with suction and dried in a desiccator at room temperature. This quaternary salt melts at 126–127° C., dissolves very readily in water, methanol, ethanol, etc., but is sparingly soluble in cold acetic ester, ether and benzin. The yield is 6 g., i. e. 43% of the theoretical.

*Example 10*

5.5 g. of 1-(4'-morpholino) - 2 - n - hexyloxy - propane (0.024 mol) as referred to in Examples 1 to 3, are gently boiled for 5 hours on a reflux condenser with 3 cc. of benzyl bromide (0.025 mol) in 25 cc. of acetic ester. Crystals already start to precipitate after 3–4 hours. The mixture is allowed to cool and the crystal magma which has formed is filtered with suction. The filter residue is repeatedly washed with ethyl acetate and then with petroleum ether. This crude product is now dissolved and recrystallized from about 80–100 cc. of benzene. Prior to being filtered with suction, it is again mixed with petroleum ether, then filtered and repeatedly washed with petroleum ether. The new N-(2-n-hexyloxy-propyl)-N-benzyl-morpholinium-bromide melts at 140° C. It is readily soluble in water, alcohols, acetone, fairly readily soluble in methyl ethylketone and hot benzene, sparingly soluble in cold benzene, very sparingly soluble in cold acetic ester and petroleum ether. The yield is 5 g., i. e. 50% of the theoretical.

We claim:

1. The new group of locally anesthetic compounds having the general formula

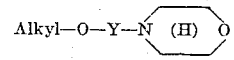

and salts thereof, wherein Alkyl- is a member of the class consisting of an alkyl and aralkyl radical containing six to seven carbon atoms and Y represents a branched chain alkylene radical containing three to four carbon atoms.

2. The new locally anesthetic (4'-morpholino)-alkyl-n-hexyl-ethers having the formula

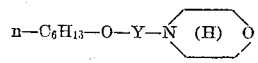

wherein Y represents a branched chain alkylene radical containing three to four carbon atoms.

3. The new 1-(4'-morpholino)-2-n-hexyloxy-propane.
4. The new 2-(4'-morpholino)-1-n-hexyloxy-propane.
5. The new 2-(4'-morpholino)-3-n-hexyloxy-butane.
6. The new 1-(4'-morpholino)-2-benzyloxy-propane.
7. A process of producing a locally anesthetic compound of the formula

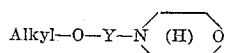

wherein Alkyl is a member of the class consisting of an alkyl and aralkyl radical containing six to seven carbon atoms and Y represents a branched chain alkylene radical containing three to four carbon atoms, which comprises treating a corresponding reactive ester of a strong acid having the formula

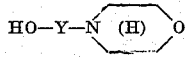

wherein X represents a reactive acid radical with a metal salt of a N-(hydroxyalky)-morpholine having the formula

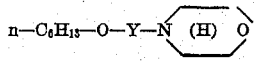

8. A process of producing a locally anesthetic compound of the formula n—C₆H₁₃—O—Y—N(H) O wherein Y represents a branched chain alkylene radical containing three to four carbon atoms, which comprises treating a n-hexyl-halide with an alkali salt of a N-(hydroxy-alkyl)-morpholine.

References Cited in the file of this patent

UNITED STATES PATENTS 2,023,872     Cox _____ Dec. 10, 1935

OTHER REFERENCES

Mason et. al.: Journal of the American Chemical Society, vol. 62, pp. 1448–50.

Harradence et. al.: Journal of the Proceedings of the Royal Society of New South Wales, vol. 73, pp. 22–28, 1939.